United States Patent [19]

Sanderson

[11] 4,347,738
[45] Sep. 7, 1982

[54] OCEANOGRAPHIC TRANSDUCER

[75] Inventor: Edward L. Sanderson, Panama City, Fla.

[73] Assignee: The United States of America as represented by the Secretary of the Navy, Washington, D.C.

[21] Appl. No.: 758,157

[22] Filed: Sep. 6, 1968

[51] Int. Cl.³ ............................................. G01W 1/00
[52] U.S. Cl. .............................. 73/170 A; 73/861.08; 73/861.09; 324/71 R; 324/439
[58] Field of Search .................. 73/194, 194 E, 194 I, 73/189, 170 A, 861.08, 861.09; 324/30, 71, 71 R, 438, 439

[56] References Cited

U.S. PATENT DOCUMENTS

| 2,615,940 | 9/1962 | Williams | 73/194 E |
| 2,794,171 | 5/1957 | Terry | 73/194 E |
| 3,242,729 | 3/1966 | Keller | 73/194 E |
| 3,416,369 | 12/1968 | Higgins | 73/194 E |
| 3,450,984 | 6/1969 | Holmes | 73/194 E |

FOREIGN PATENT DOCUMENTS 1195960  3/1963  Fed. Rep. of Germany ..... 73/194 I

*Primary Examiner*—Harold J. Tudor
*Attorney, Agent, or Firm*—Louis A. Miller; Don D. Doty; William T. Skeer

[57] ABSTRACT

A detector unit for investigation of fluid currents in conducting liquids, such as sea water, for example, employs two similar metal electrodes in contact with the fluid, one exposed to the fluid current and the other protected therefrom.

10 Claims, 8 Drawing Figures

OCEANOGRAPHIC TRANSDUCER

The invention described herein may be manufactured and used by or for the Government of the United States of America for governmental purposes without the payment of any royalties thereon or therefor.

The sciences of oceanography and hydrography have, from their inception, required the measurement of the rate of fluid flow in various bodies of water. Early devices employed components which utilized the momentum of the fluid to activate a moving part, such as an impeller, for example. These early devices are of limited value in the study of low velocity currents, where the energy available from the water is quite small. Although the progress of technology has continually extended the useful range of such instruments, other devices have replaced the momentum transfer type devices for the measurement of low velocity currents. Among the various instruments utilized are hot wire thermal meters, ultrasonic flow meters, and electromagnetic log systems.

Some prior art fluid flow transducers for use in fluid conduits use a technique which may be termed ionic tagging. In this type flow transducer, a plurality of ions are caused to be injected into the fluid, or a zone of the fluid is ionized, at a given point. From a precisely positioned second point the time of passage is detected and the rate of flow determined therefrom. Alternatively, the charge density at the second point relative to the first point may be used as indicative of the flow rate, if the ionic recombination rate for a still body of fluid is known. While the aforementioned systems work well in closed conduits, they are not suited to oceanographic measurements. Where the diffusion of the ions is not contained by a conduit, such as in an open sea installation, or where the direction of the current may move the ionized zone away from the second point, other techniques must be employed.

The aforementioned prior art instruments possess certain inherent disadvantages for network or open sea oceanographic applications. Prominent among these limiting characteristics are excessive bulk, excessive power consumption, and electronic complexity. Various ones of the previously mentioned prior art devices possess one or more of these disadvantages. There are frequent situations requiring an instrument that is responsive to small fluid currents and having a minimum of bulk and auxiliary equipment associated therewith. Such applications could include, aside from the basic oceanographic uses, systems or networks of detectors to provide indication of the passage of a marine vehicle by responding to the currents produced by the vehicle passing through the water.

Such networks detecting small displacement currents have, heretofore, been uncommon because an extremely sensitive instrument is required to respond to a current generated by the passage of a small displacement vehicle, such as a torpedo or small swimmer-delivery vehicle. The devices of the prior art sufficiently sensitive to provide reliable detection of such small currents are either too bulky or have excessive power requirements to permit their effective utilization in such applications. The detection of such current producing bodies has, therefore, used other parameters, such as electromagnetic and acoustic detection of the body directly.

There are a host of other applications which are awaiting the availability of a small, lightweight, sensitive fluid movement detector. Such a device may find utility in hydrographic studies to investigate small magnitude current patterns. The field of naval architecture has a need for laboratory instrumentation to measure currents about test models of new hull shapes which could be solved by such a device. Similarly, such a device could be utilized to measure the fluid flow within a confined conduit. Such devices may be utilized as the sensing organ in marine navigation control devices.

Accordingly, it is an object of this invention to provide a transducer responsive to small magnitude currents within a fluid body.

A further object of this invention is the provision of a lightweight device to measure small magnitude fluid currents.

Another object of the present invention is the provision of a fluid motion responsive transducing device of modest dimensions and unprecedented compactness.

Yet a further object of this invention is the provision of a transducer to convert fluid movements into electrical signals.

Still another object of this herein disclosed invention is the provision of a device which, without requiring an associated power supply, will produce an electrical output in response to fluid movement within an open body of water.

Other objects and many of the attendant advantages will be readily appreciated as the subject invention becomes better understood by reference to the following detailed description, when considered in conjunction with the accompanying drawings wherein.

Figure 1:
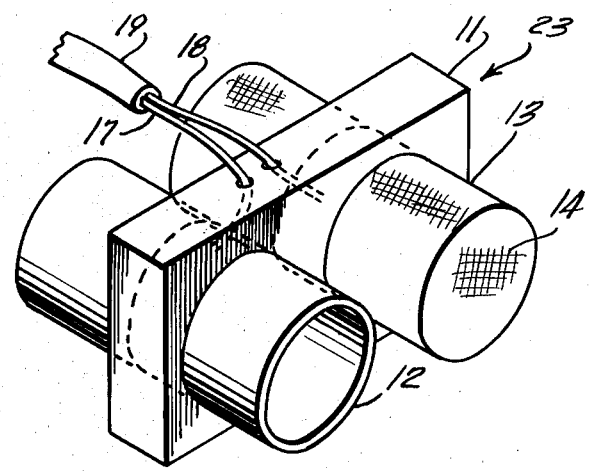
FIG. 1 shows a simplified form of the device according to the invention.

Referring to FIG. 1, there is shown a simplified construction of a device according to the invention. An electrically insulating support block 11 has mounted therethrough a pair of electrodes such as metallic cylinders 12 and 13. Cylinders 12 and 13 may be sections of metallic conduit, if desired. Cylinder 13 is enclosed within a close fitting fabric cover 14. Apertures in support block 11 communicate with the mounting apertures for cylinders 12 and 13 and permit electrical conductors 17 and 18 to make electrical contact therewith. As will be more fully explained herein, the electrical conductors 17 and 18 communicate with suitable measuring equipment via electrical cable 19, which may include other electrical conductors, if desired. Cylinders 12 and 13 may be secured within mounting block 11 in a variety of ways. For example, a simple press fit may be employed, or threaded fasteners may be extended through cylinders 12 and 13 and apertures 15 and 16 and, in addition to their securing function, may serve as electrical terminals connecting conductors 17 and 18 to cylinders 12 and 13 respectively.

The results obtained from the device of FIG. 1 are nonetheless remarkable despite its straightforward mode of operation.

Figure 2:
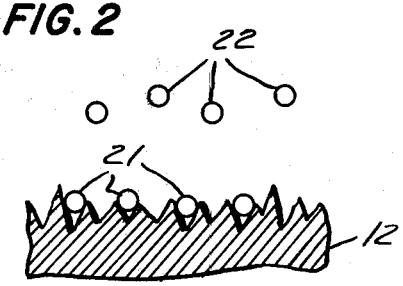
FIG. 2 depicts an enlarged section of a metallic electrode immersed in the water.

As shown in FIG. 2, a segment of cylinder 12, viewed in partial section, is seen to have surface irregularities which constitute a plurality of sharp peaks and ridges. Even when the surface of the metallic cylinder appears smooth or polished to the eye, such irregularities of microscopic proportions can be discovered upon examination. When placed in water, particularly sea water, the surface irregularities attract ions 21 thereto. The expected electrical charge due to ions 21 is not produced because the layer of ions 21 is in equilibrium with a surrounding cloud of ions 22 of opposite polarity. The surrounding cloud of ions 22 is more susceptible to the action of any fluid motion present than the layer of ions 21. A fluid current sweeping away a portion of the ions 22 will cause a change in the charge equilibrium with respect to the condition of the electrode in quiescent water or a similar electrode not exposed to the action of the current. In this manner the device differs from the prior art devices, which are used within fluid conduits and require the transportation of ions from one electrode to a second electrode spaced therefrom. The polarity of ions 21 are determined by the material from which electrodes are made and the nature of the fluid. Whatever the polarity of ions 21, the cloud of ions 22 is of the opposite charge.

The purpose of using fabric cover 14 (FIG. 1) is to provide fluid current protection for metal cylinder 13 and its associated ionic charge pattern. Fabric cover 14 may be made of any porous nonconductor. Glass fibre and canvas have proven satisfactory in this service and have the advantage of being readily available and easily repaired. Since the charge distribution shown in FIG. 2 extends only a fraction of a millimeter, the thickness of fabric cover 14 is sufficient to provide a quiescent surrounding for cylinder 13. Although the fluid may purl over the individual strands of the fabric cover 14, the fluid therebeneath and in the interstices thereof remains untroubled and, therefore, the ionic charge about the encased electrode remains uneffected by the flow of the fluid.

Cylinder 13 and cover 14, in the device of FIG. 1, serve as a standard or reference electrode to which the cylinder or electrode 12 may be compared. That is, when the device is placed in the water, there is little potential difference between them in the absence of any currents in the surrounding water. The ideal situation of no potential difference is seldom exactly obtained, even when such precautions as making the two cylinders from the same piece of stock are observed, but what very small potential as exists may be dealt with by suitable calibration techniques, as are understood by skilled practitioners of the instrumentation arts. When a fluid current embraces the device of FIG. 1, the anions surrounding cylinder 12 will be diffused and swept away in greater numbers than those associated with cylinder 13. As a result of this fluid motion, cylinder 12 exhibits an electrical potential with respect to cylinder 13.

Figure 3:
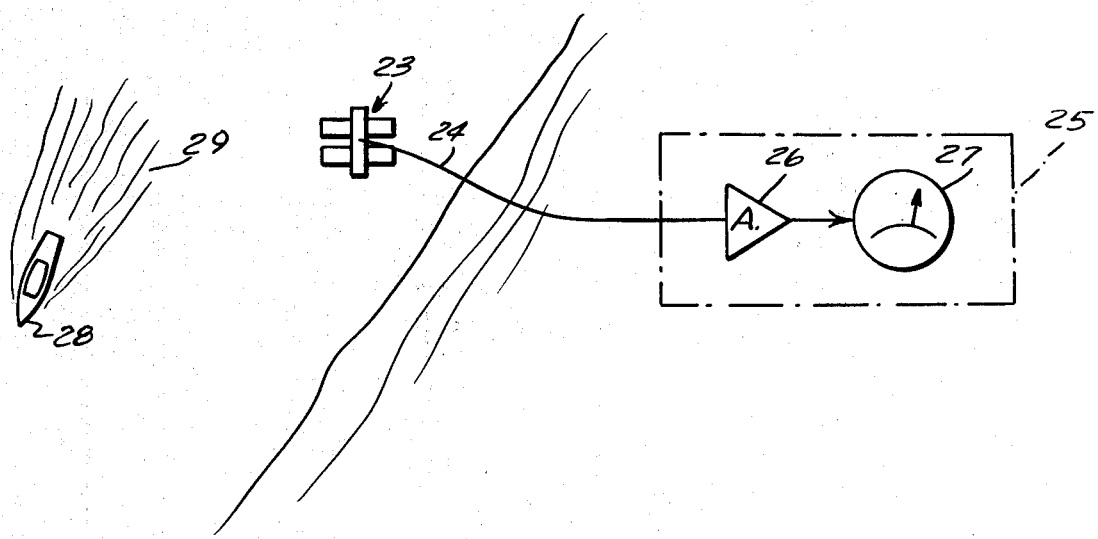
FIG. 3 illustrates how the device of the invention may be utilized in a simplified arrangement to detect the passage of a marine vehicle.

A greatly simplified showing of how the aforedescribed device can be utilized in a system for the detection of the passage of a marine vessel is shown in FIG. 3. A detector 23, which may be, either the device of FIG. 1 or another form to be described, is connected via cable 24 to a suitable utilization electrical circuit 25. Electrical circuit 25 may be any of a variety of voltage processing and/or recording systems as dictated by the circumstances of the particular installation. For purposes of explanation circuit 25 will be considered to include direct current amplifier 26 and an output meter 27. Meter 27 is caused to deflect when ship 28 traverses the area of detector 23 and the wake 29 impinges thereon. Wake 29 causes the disturbance of the ionic field about one of the electrodes, as previously described. The resulting electrical potential difference is transmitted via cable 24 to amplifier 26 where it is increased to a more useful value, in order to provide a suitable indication on meter 27.

A device similar to that of FIG. 1 has actually been used to monitor activity in a salt water harbor. It was made of 0.75" OD copper pipe and the electrodes were 3" long. Cover 14 consisted of a layer of glass fibre cloth and a layer of canvas duck having a combined thickness of 2 mm. The two electrodes were mounted on 3" centers with their longitudinal axis parallel. The sensitivity was such as to detect and indicate the movement of water displaced by the bow of a 240 ton tug from the bottom of a channel 22 feet deep at a distance of 150 feet prior to passage over the detector. The device was connected to shore instrumentation by 150 feet of insulated copper conductors spaced $\frac{1}{8}$" apart.

While the species of FIG. 1 is operational in certain applications and is sufficient for purposes of explanation, it is not without some limitations in certain operational conditions. For example, the device of FIG. 1 is sensitive to the direction of current flow as well as to the magnitude thereof. If it is desired to eliminate omnidirectional response, the construction of FIG. 4 may be utilized.

Figure 4:
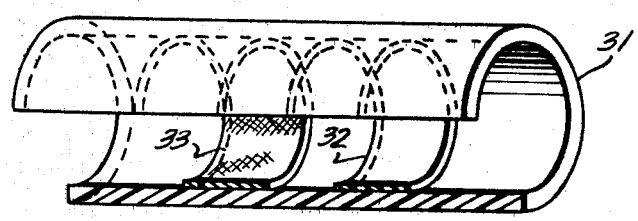
FIGS. 4–8 illustrate various forms and configurations of transducer devices according to the teachings of the invention.

In FIG. 4, an insulating tube 31 houses an annular bare electrode 32 and a coaxially positioned covered electrode 33. In such an arrangement the electrodes function in the same fashion as previously described but electrodes 32 and 33 are only exposed to fluid currents which are directionally oriented to traverse the axial passage of tube 31. The directivity, i.e., the directional sensitivity, is a function of the ratio between the length and inside diameter of tube and may be adjusted to meet the particular parameters of the desired application. Other modifications to the tube 31, such as flaring or baffling the ends, may be used, so as to further modify the response thereof.

In some applications it may be desirable to ascertain both the direction as well as the magnitude of the fluid motion. In such instances the configuration of FIG. 5 may be used. As shown, three transducers 34, 35, and 36 of the FIG. 4 type may be mounted in a mutually perpendicular arrangement by conventional means, not shown. By connection of each of the transducer units to appropriate circuitry, the component of flow in each direction may be obtained and the direction ascertained. It should be noted that the units of FIG. 4 are bidirectional but their placement is usually such that only current in one of the two directions may be expected.

Figure 6:
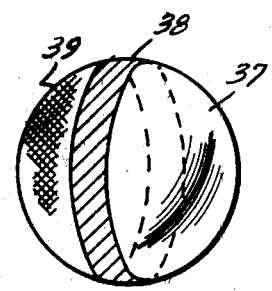

Other configurations are possible also. FIG. 6, for example, shows a spherical form with bare electrode 37 separated by insulator 38 from covered electrode 39. This configuration is useful where the direction of fluid flow is known, as in a conduit for example, and the unit can be placed in fixed orientation thereto.

Figure 7:
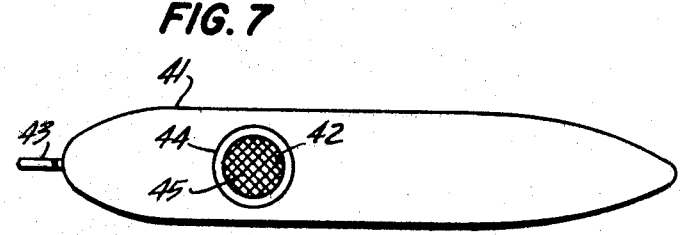

FIG. 7 depicts still another basic form of the invention in which a streamlined body portion 41 comprises the bare electrode. A reference electrode 42 is carried within a transverse aperture and insulated from said body portion by an insulating carrier tube 44. The current flowing over body portion 41 is prevented from flushing reference electrode 42 by a water permeable material 45 filling tube 44. The device of FIG. 7 may be streamed aft or to one side of a marine vessel by tow ring 43 to measure the velocity thereof. Other applications of the streamlined embodiment include mounting the device on fixed supports on either side of a large marine vessel. In such a mounting arrangement, two such detectors may be connected in a bridge circuit in such a manner as to detect yawing of the ship. This detected yaw signal, in turn, can be used to correct the yawing attitude in a manner familiar to those versed in cybernetic control applications.

Figure 5:
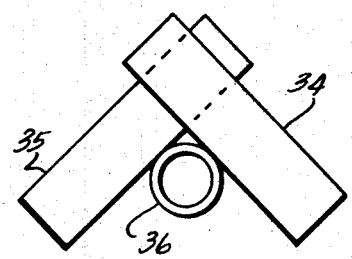

The specific attachment of electrical conductors to the device of FIG. 7, as well as the devices of FIGS. 4, 5, and 6, is not shown for purposes of simplicity of illustration. The particular attachment structure is not critical to the devices and, accordingly, any conventional technique, including that of FIGS. 1 and 8, that is compatible with the requirements of the particular installation may be employed.

Figure 8:
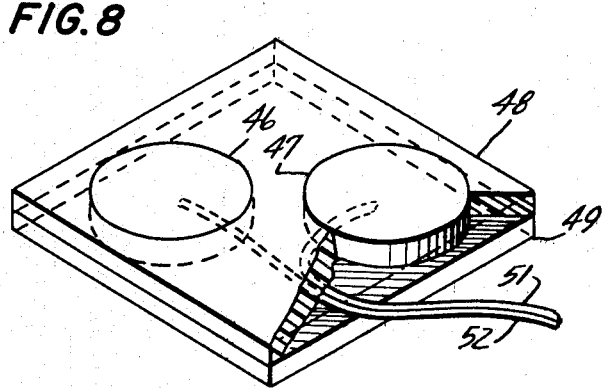

A planiform configuration of the device of the invention is shown in FIG. 8. In this embodiment covered electrode 46 and bare electrode 47 are mounted in an insulating mounting plate 48 with their longitudinal axes parallel and secured in such a manner that their front surfaces are coplanar with the surface thereof. Any method of assembly, such as press fitting or molding, appropriate to working the particular materials may be used. A backing plate 49 is secured to the rear of mounting plate 48 in such a fashion as to provide a watertight seal and to encapsulate conductors 51 and 52 therebetween. In this configuration the device may be flush mounted along the surface of a variety of marine devices. As in the foregoing examples, this embodiment the device may be made quite small, on the order of a few square millimeters.

It is noted that some freedom of choice exists as to the selection of materials from which the electrodes may be made. The voltage generated by a particular magnitude fluid current depends in a predictable manner with the materials employed for the electrodes. Those with higher electrochemical voltages produce, of course, higher outputs. However, some attention must also be paid to the action of the sea water on the electrodes. In practice, copper and certain other conductors have proven satisfactory.

It has been found that the signals generated by devices of the invention are best processed by equipment having a linear response in the 0–20 cps range. Modern electronic technology is able to supply a variety of equipment, i.e., recorders, meter amplifiers, and telemetry devices, using solid state devices and having the desired frequency range. Many such devices are miniaturized solid state units particularly suited to oceanographic applications. With such equipment, fluid movements of the magnitudes of 0.005 feet per second may be detected.

From the foregoing description, it is clear that this invention provides a fluid motin transducer which is lightweight, mechanically simple and of rugged construction. Further, the device of the invention is omnidirectionally sensitive and may, accordingly, be used in open bodies of fluid. The herein disclosed device is responsive to fluid motions of extremely low magnitudes and, in general, is an instrument of exceptional and unprecedented effectiveness in meeting all of the herein stated objects of invention.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

I claim:

1. A transducer for producing an electrical signal indicative of and proportional to the current flowing within a predetermined fluid comprising:
   a first electrode disposed within said predetermined fluid so as to be in contact with the current flowing therein and having a surface which produces a galvanic action when disposed in contact with said predetermined fluid;
   a second electrode of the same material as said first electrode spatially disposed from said first electrode and having a surface for contact with said predetermined fluid when immersed therein;
   a fluid permeable means enclosing said second electrode in such manner as to permit the surface thereof to be contacted by said predetermined fluid while being isolated from the current thereof; and
   means connected to said first electrode, to said second electrode enclosing means, and effectively to said second electrode for the supporting thereof in a predetermined geometrical configuration.

2. A transducer according to claim 1 in which said first and second electrodes are cylindrical.

3. A transducer according to claim 1 in which said first and second electrodes are spherical sectors.

4. A transducer according to claim 1 in which said first electrode is shaped as to provide a streamlined surrounding for said support means and said second electrode.

5. A transducer according to claim 1 in which said fluid permeable means is made of a porous fabric.

6. A transducer according to claim 5 in which said first and second electrodes are cylindrical.

7. A transducer according to claim 6 in which said supporting means supports said electrodes such that their axes are colinear.

8. A transducer according to claim 6 in which said supporting means positions said electrodes such that the axes thereof are coplanar.

9. A transducer according to claim 8 in which said supporting means is a dielectric bilayer, one layer of which confines both said first electrode and said enclosed second electrode in apertures therein and said second layer is coextensive with said one layer and bonded thereto to provide a watertight seal therebetween.

10. A transducer according to claim 9 in which the opposite ends of each of said cylindrical electrodes are coplanar with the corresponding surfaces of said apertured lamina.

* * * * *